United States Patent [19]

Knepler

[11] Patent Number: 4,917,005
[45] Date of Patent: Apr. 17, 1990

[54] BEVERAGE BREWER WITH BREWING TEMPERATURE INTERLOCK

[75] Inventor: John T. Knepler, Chatham, Ill.

[73] Assignee: Bunn-O-Matic Corporation, Springfield, Ill.

[21] Appl. No.: 364,974

[22] Filed: Jun. 9, 1989

[51] Int. Cl.⁴ .............................................. A47J 31/00
[52] U.S. Cl. ........................................ 99/280; 99/307; 219/297
[58] Field of Search .................. 99/280, 281, 282, 283, 99/285, 295, 300, 304, 307; 426/433; 219/297, 298, 312, 323

[56] References Cited

U.S. PATENT DOCUMENTS

| | | | |
|---|---|---|---|
| 3,793,934 | 2/1974 | Martin | 99/282 |
| 4,413,552 | 11/1983 | Daugherty | 99/295 |
| 4,464,981 | 8/1984 | Stover | 99/280 |
| 4,478,139 | 10/1984 | Zimmerman | 99/280 |
| 4,579,048 | 4/1986 | Stover | 99/295 |

*Primary Examiner*—Robert W. Jenkins
*Attorney, Agent, or Firm*—Richard Bushnell

[57] ABSTRACT

A beverage brewer includes a water reservoir in which water is heated to a predetermined brewing temperature by a resistance heater element within the reservoir. To initiate a brewing cycle cold water is admitted to the reservoir for a predetermined time period through an electrically operated fill valve to displace a predetermined volume of heated water from the reservoir. The heated water flows through a beverage filter containing coffee or tea to a serving beaker. A temperature interlock circuit having a temperature sensing element in the reservoir prevents actuation of the fill valve when the reservoir temperature falls below a predetermined minimum level.

11 Claims, 3 Drawing Sheets

BEVERAGE BREWER WITH BREWING TEMPERATURE INTERLOCK

BACKGROUND OF THE INVENTION

The present invention is directed generally to brewing apparatus for heated beverages, such as coffee and tea, and more particularly to brewing apparatus having a hot water reservoir and a temperature interlock circuit which prevents dispensing hot water from the reservoir when the temperature of the hot water falls below a predetermined minimum temperature level.

One known type of brewing apparatus for making heated beverages includes a reservoir within which a volume of water to be displaced is heated by a resistance heating element to a predetermined brewing temperature. In a preferred form of such brewing apparatus, such as the coffee maker described in U.S. Pat. No. 4,413,552, heated water is displaced from the top portion, or outlet zone, of the reservoir by cool or cold water entering the bottom portion, or inlet zone, and discharged onto ground coffee or tea held in a brewer funnel lined with a disposable filter. Freshly brewed coffee or tea discharging from the brewer funnel is collected in a serving beaker.

Cold water is admitted in batches of predetermined volume to the reservoir of such brewing apparatus to displace the heated water delivered to the brewing funnel. In pour-in type beverage brewers, such as described in the aforementioned U.S. Pat. No. 4,413,552, a volume of cold water sufficient to produce the desired volume of beverage to be brewed is poured into a cold water basin from which it flows by gravity into the reservoir to displace an equal volume of hot water to the brewing funnel. In automatic type beverage brewers, such as described in U.S. Pat. Nos. 3,793,934 and 4,478,139, a valve is opened by electrical or manual means for a predetermined period of time to periodically deliver the desired volume of cold water to the reservoir.

One problem with such displacement brewers has been the possibility that, with repeated uses over a short time interval, the water displaced from the reservoir for brewing may not be of sufficiently high temperature for brewing purposes, resulting in an inferior beverage. The present invention avoids this possibility by providing an interlock which prevents the displacement of water from the reservoir when the temperature of the water in the reservoir falls below a predetermined minimum level. In a particularly advantageous implementation of the invention, a single temperature sensing element in the reservoir provides both the interlock function and regulation of temperature in the reservoir.

SUMMARY OF THE INVENTION

The invention is directed to a beverage brewer of the type having reservoir means for maintaining a supply of heated water to be dispensed for brewing by cold water admitted to the reservoir, a resistance heating element operable from an applied electric current for raising and maintaining the temperature of the water in the reservoir, and electrically operated user-actuable valve means for controlling the dispensing of heated water from the reservoir. Temperature sensing means responsive to the temperature of the water in the reservoir produce a control signal indicative of the water temperature. Circuit means responsive to the control signal inhibit user actuation of the valve means when the temperature of the water in the reservoir falls below a predetermined minimum level.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
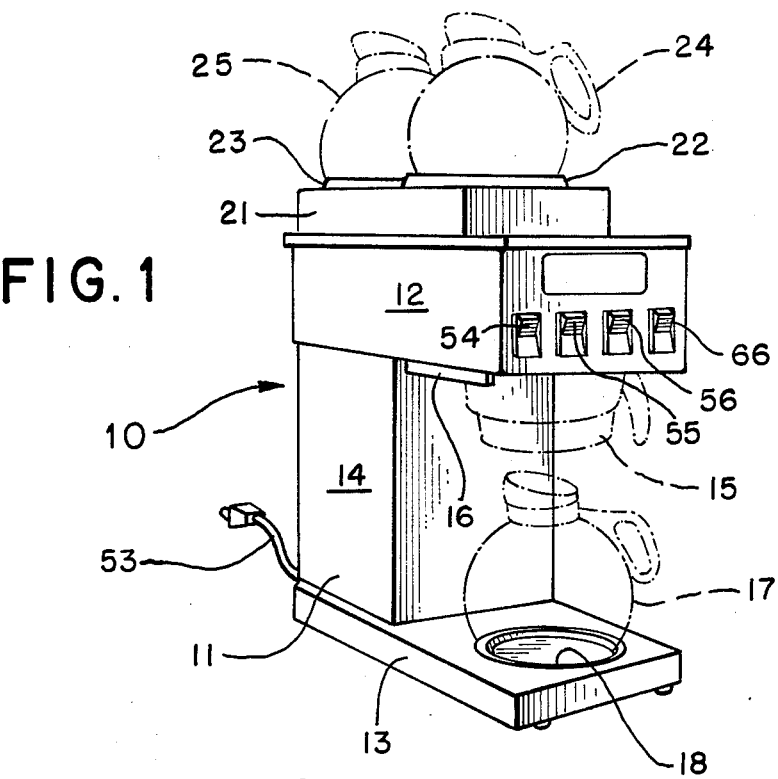
FIG. 1 is a perspective view of an automatic dispensing coffee brewer forming one embodiment of the present invention shown in conjunction with three coffee beakers and a removable brewer funnel in broken outline.

Referring to the drawings, and particularly to FIG. 1, a coffee maker 10 incorporating the invention is seen to have a generally C-shaped body 11 which includes an upper body portion 12, a lower body portion 13, and an interconnecting upright body portion 14. The coffee maker body 11 is fabricated in a conventional manner, preferably from stainless steel sheet, but may be fabricated from other metals or from known plastics having suitable strength and durability. A brewer funnel 15 Of conventional construction is removably supported in a conventional manner by guide rails 16 underneath the upper body portion 12. A coffee serving beaker 17 is removably supported on the bottom body portion 13 underneath the brewer funnel 15 on a heated warming plate 18 mounted on the top surface of the lower body portion 13.

A cold water pour-in opening 20 (FIG. 2) is located on the top front portion of the upper body portion 12. Rearwardly thereof, a top warmer unit 21 is mounted which includes a pair of warming plates 22 and 23 on which two additional serving beakers 24 and 25 may be mounted.

Figure 4:
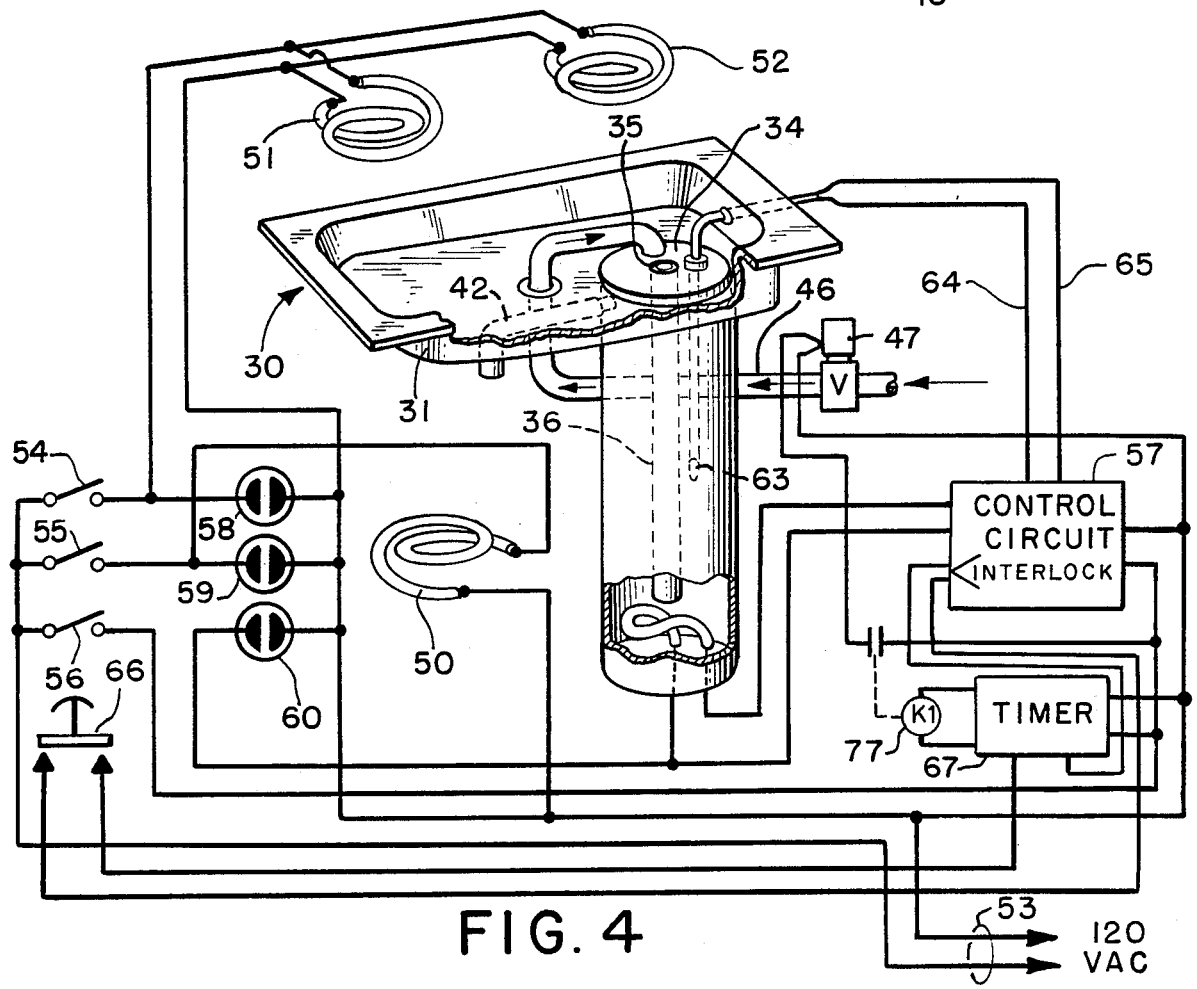
FIG. 4 is a simplified perspective view of certain principal elements of the coffee brewer and the electrical circuitry associated therewith.
Figure 2:
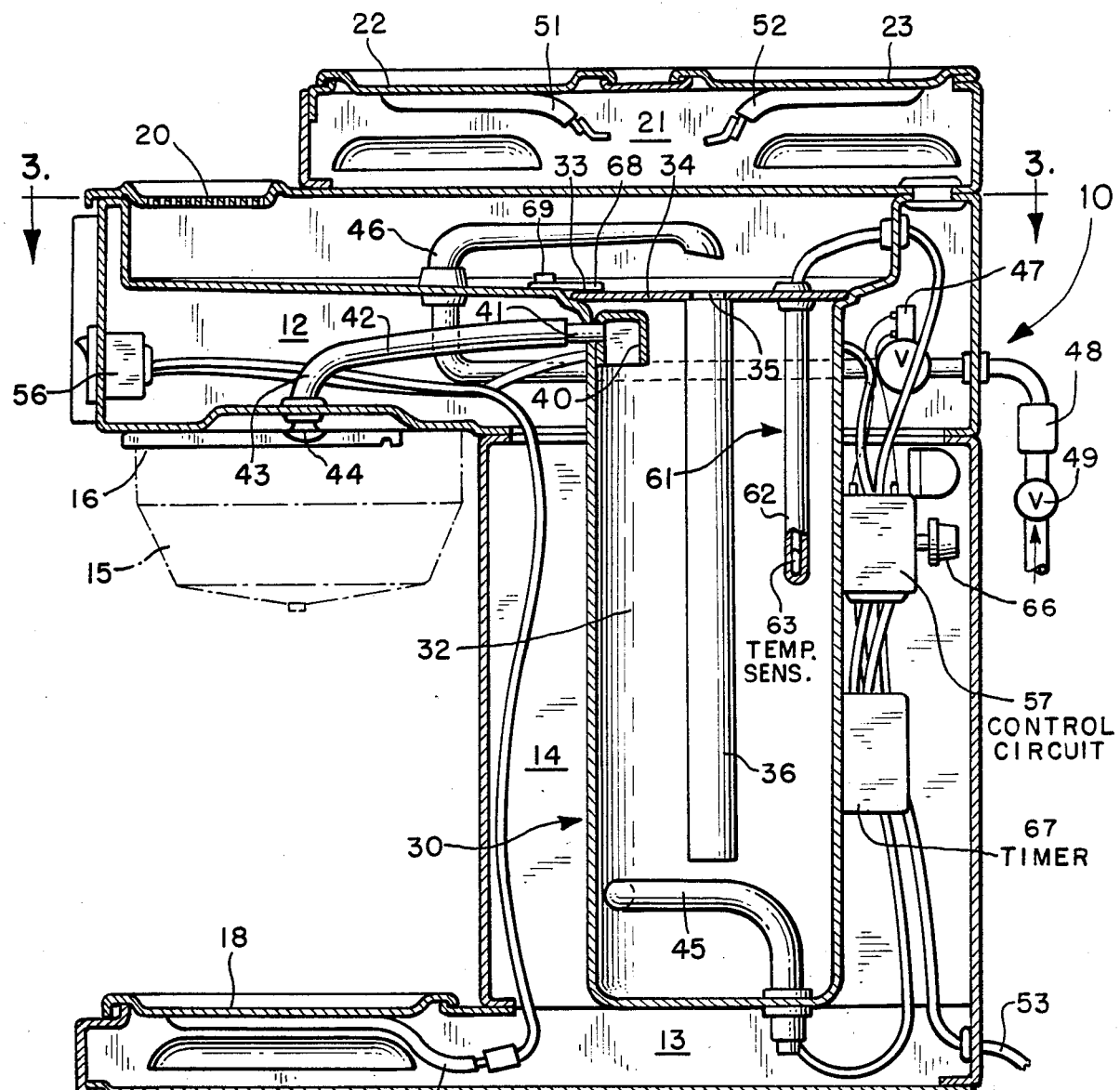
FIG. 2 is an enlarged vertical section view of the coffee brewer of FIG. 1, certain parts therein being shown in elevation for clarity.
Figure 3:
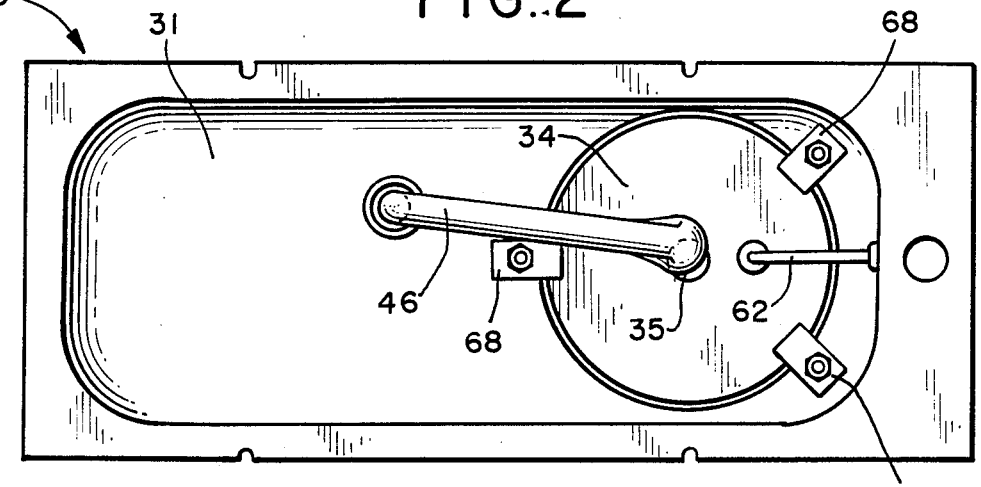
FIG. 3 is a partial top plan view of the coffee brewer taken along line 3—3 of FIG. 2.

The upper body portion 12 and the central vertical body portion 14 house an integral, inverted L-shaped combination elongated cold water basin and hot water reservoir assembly indicated generally at 30 in FIGS. 2-4. The elongated cold water basin 31 of the assembly is preferably die-pressed in a conventional manner from stainless steel sheet so as to have a continuous seamless bottom of progressively increasing depth toward the rear of the coffee brewer. The hot water reservoir 32 of the assembly is welded to a bottom opening 33 (FIG. 2) formed adjacent the deep end of the basin 31. The reservoir 32 is also preferably fabricated from stainless steel sheet in a conventional manner. As best seen in FIG. 2, the bottom of the basin 31 slopes toward recess 33 so that cold water poured into basin 31 will flow and drain into reservoir 32.

The circular opening communicating between the bottom of basic 31 and the top of hot water reservoir 32 is closed by a disk-shapedbaffle 34. A central opening 35 is provided in the baffle 34 which communicates with the upper end of a vertical cold water tube 36, the upper end of which is welded or otherwise suitably joined to the underside of baffle 34. The bottom end of the cold water tube 36 terminates adjacent the bottom end of reservoir 32 so that as cold water flows downwardly through tube 36 it is discharged in the bottom portion of reservoir 32, thereby displacing upwardly the hot water contained in the reservoir.

An inverted siphon cup 40 (FIG. 2) is positioned adjacent the top of reservoir 32 near the removable brewer funnel 15. The siphon cup 40 is carried by the inner end of a nipple 41 which projects in fluid-sealed relationship through an aperture in the wall of reservoir 32. The outer end of the nipple 41 connects with a downwardly slanted tube 42 having a downturned outer or distal end 43 on the lower end of which a hot water spray head 44 is fastened in a conventional manner.

Water within reservoir 32 is heated in a conventional manner by a heating element 45, which may take the form of a Calrod resistance heating element or other known electrically energized heating element.

Cold water is supplied to reservoir 32 through a tubing segment 46, which extends from an external water source (not shown) to a location adjacent the open end of inlet tube 36. The tubing segment includes in-line a conventional solenoid-actuated valve 47, a conventional flow regulator 48, and a manual shut-off valve 49.

Referring to FIG. 4, electrical power is supplied to three resistance heating elements 50, 51 and 52 associated with hot plate assemblies 18, 22 and 23, respectively; and to the resistance heating unit 45 contained within reservoir 32, by electrical circuitry within housing 11. Electrical power is supplied to this circuitry by a conventional line cord 53. A first electrical switch 54 on the front surface of housing portion 12 controls the application of power to the two resistance heater elements 51 and 52 associated with the top plates 22 and 23. A second electrical switch 55 controls the application of electrical power to resistane heating element 50 associated with the bottom hot plate 18. A third electrical switch 56 controls the application of electrical power to a control unit 57, which contains circuitry for controlling electrical power supplied to resistance heating element 45 to maintain a predetermined water temperature in hot water reservoir 32, and, in accordance with the invention, circuitry for preventing the dispensing of water from the reservoir when the water is below a predetermined temperature. Visual indication of the operation of the various resistance heaters is provided by neon-type indicator lamps 58, 59 and 60, which may be incorporated integrally within switches 54–56 to illuminate upon actuation of the respective circuits.

One side of the A/C line is connected to one terminal of each of switches 54–56. Upon closure of switch 54, power is applied to resistance heating elements 51 and 52 and indicator lamp 58. This causes the hot plates 22 and 23 to heat, and coffee placed on these plates as in beakers 24 and 25 to be kept warm for serving. Upon closure of switch 55, resistance heating element 50 and indicator lamp 59 are energized. This causes the bottom hot plate 18 to heat coffee contained in serving beaker 16. Closure of switch 56 causes reservoir heater 45 to be powered.

As best seen in FIG. 2, the temperature probe 61 consists of a semi-flexible tubing segment 62 which extends through cover 35 downwardly to a generally central portion of reservoir 32. An upper portion of this tubing segment 62 is directed at a generally right angle through the rear side wall of basin 31 through an aperture provided for that purpose. The tubing segment 62, which is preferably formed of a heat-conductive metal such as copper, is closed at its bottom end and extends through plate 34 and the rear wall of basin 31. To sense temperature within the reservoir, a thermistor 63 (FIG. 2) is positioned near the tubing end. A pair of electrical conductors 64 and 65 extend from the thermistor through tubing segment 62 to control unit 57.

The tubing segment 62 affords protection to thermistor 63 against exposure to liquid within reservoir 32 or basin 31. In addition, the semi-rigidity of tubing segment 62 allows thermistor 63 to be accurately positioned near the central portion of reservoir 32. Adjustment of the exact position may be conveniently accomplished by manually deforming th tubing segment 62 until the thermistor 63 has been properly positioned. In practice, where cold water is admitted to the bottom ¼ portion or inlet zone of the reservoir, and heated water is withdrawn from the top ¼ portion, or outlet zone, of the reservoir, it has been found that thermistor 63 is preferably disposed at or near the center, or brew zone, of the reservoir so as to optimize its response to water changes.

In accordance with conventional practice in automatic-cycle beverage brewers the brewing cycle is initiated a momentary-contact switch 66, which actuates a conventional timer circuit 67 to apply power to a control relay 77. Relay 77 then applies power to solenoid-actuated valve 47 to open the valve for a predetermined time period corresponding to that required to displace one beaker or other desired brew volume of hot water. Assuming that a two quart batch of coffee is to be brewed, the valve is actuated open until two quarts of cold water have been supplied to reservoir 32. The entrance of the cold water into the bottom portion of the hot water reservoir 32 is at such a restrained rate that it does not mix to a substantial extent with the hot water in the reservoir, but rather, the incoming cold water displaces the hot water upwardly so that it flows out through side tube 42. Once this flow has started, it continues due to siphoning action until the water level in reservoir 32 drops below and exposes the bottom of the inverted siphon cup 40. In a manner well known to the art, hot water sprays from the spray head 44 onto the ground coffee (or tea) in the brewing funnel 15, and the coffee beverage forms in the funnel and discharges through the bottom of funnel 15 into serving beaker 17.

Circuitry within control unit 57 responds to the temperature-dependent resistance of thermistor 63 to periodically switch operating power on and off to resistance heating element 45. The rate of switching is dependent on the sensed temperature. For example, a temperature greater than 5° F. below the selected temperature causes the heating element to be continuously powered (i.e., 100% duty cycle), while a temperature within 5° F. of the selected temperature causes the heating element to be powered for a lesser time period, decreasing to approximately 10% at the selected temperature. When the water temperature sensed by thermistor 63 is higher than the desired temperature, resistance heating element 45 is not powered.

The actual switching of electrical power to heating element 45 is accomplished by a bilateral switching device in the form of a triac 76 in response to control signals generated by the temperature control circuitry within control unit 57. As a result of being periodically switched on and off substantial heat dissipation occurs in triac 76 which, if not dissipated, would ultimately result in the destruction of that device. To provide for dissipation of this heat triac 76 may be mounted in thermal communication with reservoir 32, preferably to the bottom wall thereof. Thus mounted, the heat generated within the triac during the switching operation is transferred to the relatively high heat capacity of the reservoir. This obviates the need on the exterior surface of housing 11 for a separate heat sink, which could present air circulation and cleaning problems for the user.

To preclude the inadvertent use of insufficiently heated water, temperature probe assembly 62 provides a signal to control unit 57 indicative of reservoir water temperature. Within control unit 57 this signal is monitored and in the event that the temperature falls outside of a predetermined operating range the operation of timer 67 is inhibited to prevent water from being dispensed, and an optional indicator lamp 78 (FIG. 5) is extinguished.

As shown in FIG. 3, control unit 57 includes a potentiometer 81 for setting the nominal temperature at which hot water is dispensed. An LED indicator lamp 82 within control unit 57 viewable by the user lights to indicate those time periods in which the resistance heating element 71 is energized. This enables the user, by adjusting potentiometer 81 for short regular flashes corresponding to a duty period of approximately 10%, to adjust the temperature control circuit to a desired existing water temperature. A second potentiometer adjustment 83 within the control unit provides for adjustment of the range or operating window of temperatures at which heated water can be dispensed and indicator lamp 78 will be lit.

Figure 5:
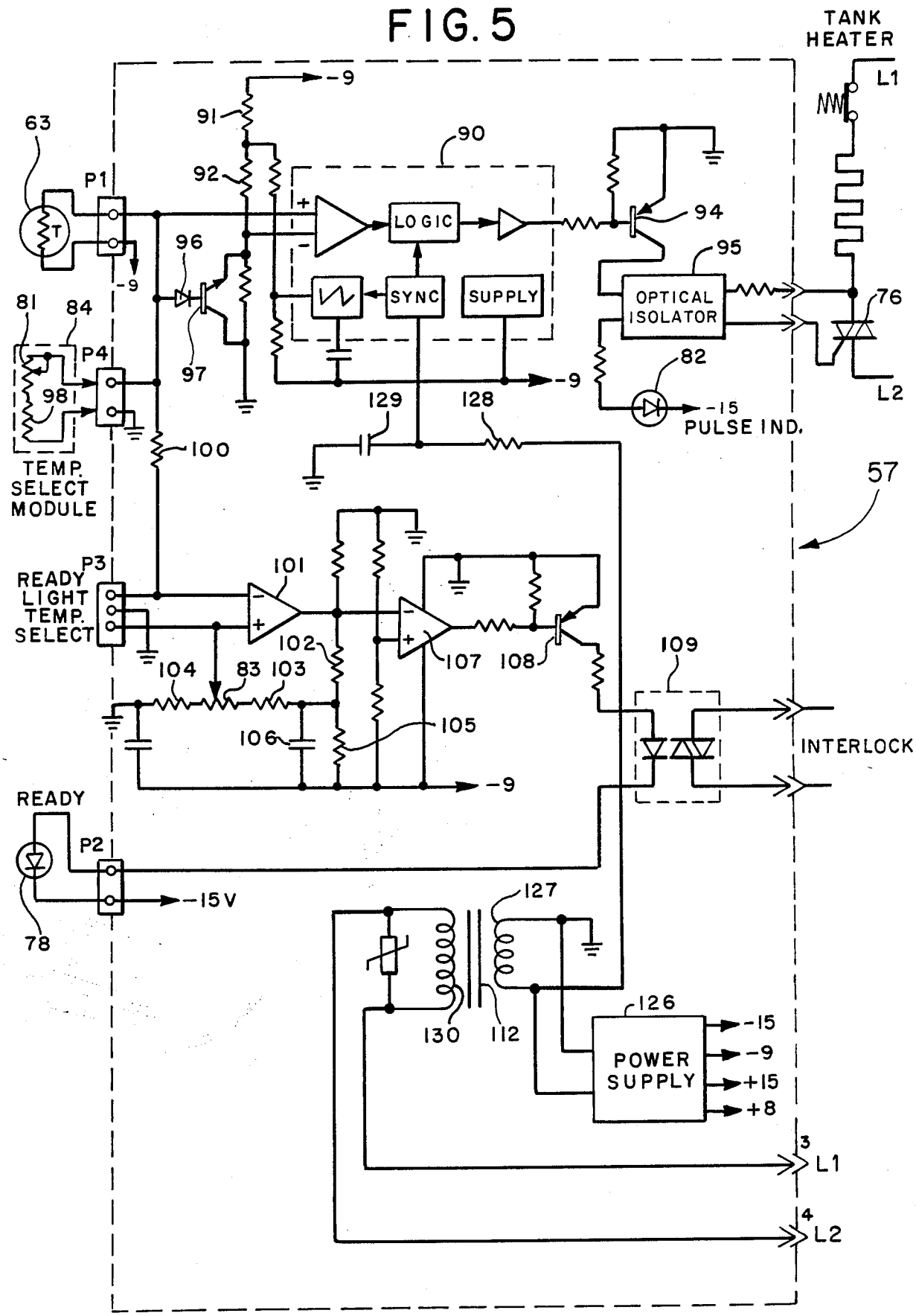
FIG. 5 is a simplified schematic diagram partially in functional bock form of the resistance heater control and temperature interlock circuits of the coffee brewer.

Referring to FIG. 5, control unit 57 is seen to include a temperature control module 84 which can be interchanged on connector P4 to permit operation in different temperature ranges. This allows potentiometer 81 to be adjustable over a relatively narrow range of temperatures selected by the temperature module 84, thereby allowing the operating temperature of the dispenser to be set with great accuracy. When changing selecting brewing outside of the existing range, a new temperature module is selected having a operating range which includes the newly desired temperature and the potentiometer associated with that module is then set by the user to accurately establish the new temperature at which hot water is to be dispensed.

A similar arrangement using a removable module 85 (FIG. 5) may be provided in association with socket P3 to modify the range of temperatures over which indicator lamp 21 will light. Modules 84 and 85 may be contained within a housing of control unit 57, appropriate access holes being provided in the cover of the module to provide for user adjustment. Similarly, indicator lamp 82 may be provided with an aperture to enable the lamp to be viewed by the user when making an adjustment to potentiometer 81.

Referring to FIG. 5, within the control circuit unit 57 temperature control is accomplished by an integrated circuit 90, which may be a commercially available Telefunken (Trademark) type U217B zero-voltage switch circuit of conventional construction and operation. Basically, thermistor 63 is connected to the non-inverting input of a comparator amplifier within the integrated circuit. A reference voltage is applied to the inverting input of the differential amplifier by a voltage divider comprising resistors 91, 92 and 93. The integrated circuit operates in a conventional manner to generate zero-crossing pulses for application to triac 76 in accordance with the differential voltage existing at the differential amplifier. The output of integrated circuit 90 is applied through a transistor 94 to an optical isolator 95, wherein an amplified and isolated output signal is developed for application to the gate electrode of triac 76. LED indicator 82 is connected in series with the output of integrated circuit 90 to provide an indication that triac 76 is being pulsed to a conductive condition.

To prevent a continuous application of current to resistance heating element 45 in the event of an open circuit to thermistor 63 a diode 96 and transistor 97 are provided to form an open sensor protection circuit. Should thermistor 74 or its connections become open transistor 97 is biased into saturation, effectively connecting the non-inverting and inverting inputs of the differential amplifier of circuit 90 together and preventing the production of further control pulses to triac 76.

The temperature which will be maintained by heating element 71 is selected by potentiometer 81, which together with a fixed resistor 98 is contained on the removable temperature select module 84. Thermistor 63, potentiometer 81 and resistor 98 form a voltage divider which causes a portion of the −9 volt voltage applied to thermistor 74 to be applied to the non-inverting input of the differential amplifier of integrated circuit 90. Resistor 98 is selected relative to potentiometer 81 so that the potentiometer need only operate over a limited range which includes the desired operating temperature.

By reason of the temperature select module 84 being pluggable, a different operating range can be readily selected either at the factory during initial manufacture, or in the field, by plugging in a different module having a different combination of resistance for potentiometer 81 and fixed resistance 98 appropriate for the newly selected operating temperature.

To insure that water being drawn from reservoir 32 is within a predetermined range of operating temperatures, thermistor 63 is also connected through a resistor 100 to the inverting input of a differential amplifier 101. The non-inverting input of this amplifier is connected to the arm of the range select potentiometer 83, which together with fixed resistors 102, 103, 104 and 105 forms part of a voltage divider between the −9 volt source of the module, the output of amplifier 101 and ground. A reference voltage is established at the arm of potentiometer 83, and hence at the non-inverting input of differential amplifier 101. Resistors 102 and 105 introduce positive feedback at the output of amplifier 101 which establishes a hysteresis of approximately 5° F. between temperatures at which the dispensing is enabled and prevented.

The output of differential amplifier 101 is applied to the inverting input of a second differential amplifier 107, wherein it is inverted and amplified. The output of amplifier 107 is applied through a transistor 108 to optical isolator 109 and indicator lamp 78. Additional control is possible through connector P3, which provides direct connections to the inverting and non-inverting inputs of differential amplifier 101.

The various negative polarity and positive polarity voltages required by the circuitry of control unit 57 may be provided by a conventional power supply circuit 126. This circuit receives alternating current from a secondary winding 127 of power transformer 112. One terminal of winding 127 is connected to ground and the other terminal is connected through a network comprising a resistor 128 and capacitor 129 to synchronize the operation of the zero-crossing switch circuit contained within integrated circuit 90. The primary winding 130 of transformer 112 may be connected to the AC line ($L_1$ and $L_2$) utilized to power the hot water dispenser.

Thus, a coffee brewer is provided wherein an interlock circuit automatically prevents a brew cycle from being initiated when hot water at a desired brewing temperature is not available. This is done without requiring any action on the part of the server, making the system particularly advantageous in a busy restaurant or kitchen.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A beverage brewing apparatus comprising:
   a hot water reservoir;
   inlet means for admitting cold water into said reservoir;
   a resistance heating element within the reservoir operable from an applied electric current for heating water in the reservoir;
   dispensing means including user-actuable solenoid valve for dispensing heated water from the reservoir;
   temperature sensing means for producing a signal indicative of the temperature of the water in said reservoir; and
   interlock circuit means responsive to said temperature-indicative signal for inhibiting the operation of said valve when the temperature of the water in said reservoir falls below a predetermined minimum brewing temperature.

2. A beverage brewing apparatus as defined in claim 1 wherein said inlet means comprise a conduit for admitting cold water into said reservoir, and said solenoid valve is disposed inline therein.

3. A beverage brewing apparatus as defined in claim 1 including temperature control means responsive to said temperature-indicative signal for controlling the application of current to said resistance heater to maintain the temperature of the water in said reservoir at a nominal temperature greater than said predetermined minimum brewing temperature.

4. A beverage brewing apparatus as defined in claim 1 wherein said temperature sensing means comprise a thermistor.

5. A beverage brewing apparatus as defined in claim 4 wherein said thermistor is disposed within a segment of heat-conductive tubing disposed within said reservoir.

6. A beverage brewing apparatus as defined in claim 5 wherein said tubing segment is formed of a formable heat-conductive metal.

7. A beverage brewing apparatus as defined in claim 1 wherein said inlet means admit cold water to a bottom portion of said reservoir, said outlet means discharge heated water from a top portion of said reservoir, and said temperature sensing means sense the temperature of the water in said reservoir at a central portion intermediate said top and bottom portions.

8. A beverage brewing apparatus comprising:
   a hot water reservoir;
   inlet means for admitting cold water into said reservoir;
   a resistance heating element within the reservoir operable from an applied electric current for heating water in the reservoir;
   dispensing means including user-actuable solenoid valve for dispensing heated water from the reservoir;
   said inlet means comprising a conduit for admitting cold water into said reservoir, and said solenoid valve is being disposed in line therein;
   temperature sensing means for producing a signal indicative of the temperature of the water in said reservoir;
   temperature control means responsive to said temperature-indicative signal for controlling the application of current to said resistance heater to maintain the temperature of the water in said reservoir at a nominal temperature greater than said predetermined minimum brewing temperature; and
   interlock circuit means responsive to said temperature-indicative signal for inhibiting the operation of said valve when the temperature of the water in said reservoir falls below a predetermined minimum brewing temperature.

9. A beverage brewing apparatus as defined in claim 8 wherein said temperature sensing means comprise a thermistor.

10. A beverage brewing apparatus as defined in claim 9 wherein said thermistor is disposed within a segment of heat-conductive tubing disposed within said reservoir.

11. A beverage brewing apparatus as defined in claim 10 wherein said tubing segment is formed of a formable heat-conductive metal.

* * * * *

UNITED STATES PATENT AND TRADEMARK OFFICE
CERTIFICATE OF CORRECTION

PATENT NO. : 4,917,005
DATED : April 17, 1990
INVENTOR(S) : John T. Knepler

It is certified that error appears in the above-identified patent and that said Letters Patent is hereby corrected as shown below:

Column 2, Line 41 "funnel 15 Of" it should be --funnel 15 of --

Column 3, Line 5 "disk-shapedbaffle 34." it should be -- disk-shaped baffle 34. --

Column 4, Line 23 " deforming th tubing" it should be -- deforming the tubing --

Column 4, Lines 33 and 34 "initiated a momentary-contact" it should be -- initiated by a momentary-contact --

Signed and Sealed this

Twenty-eighth Day of July, 1992

Attest:

DOUGLAS B. COMER

*Attesting Officer*   *Acting Commissioner of Patents and Trademarks*